(No Model.) 4 Sheets—Sheet 1.
G. FORBES.
APPARATUS FOR MEASURING ELECTRICITY.

No. 366,824. Patented July 19, 1887.

Witnesses:

Inventor:
George Forbes
by Connoly Bros
Atty (No Model.) 4 Sheets—Sheet 2.

G. FORBES.

APPARATUS FOR MEASURING ELECTRICITY.

No. 366,824. Patented July 19, 1887.

Witnesses:
J. B. McGirr.
H. L. Pope

Inventor
George Forbes
by Connely Bros
attys.

(No Model.) 4 Sheets—Sheet 3.
G. FORBES.
APPARATUS FOR MEASURING ELECTRICITY.

No. 366,824. Patented July 19, 1887.

Witnesses:
Inventor:
George Forbes (No Model.) 4 Sheets—Sheet 4.

G. FORBES.
APPARATUS FOR MEASURING ELECTRICITY.

No. 366,824. Patented July 19, 1887.

Witnesses:

Inventor:

UNITED STATES PATENT OFFICE.

GEORGE FORBES, OF LONDON, COUNTY OF MIDDLESEX, ENGLAND.

APPARATUS FOR MEASURING ELECTRICITY.

SPECIFICATION forming part of Letters Patent No. 366,824, dated July 19, 1887.

Application filed March 10, 1887. Serial No. 230,451. (No model.)

*To all whom it may concern:*

Be it known that I, GEORGE FORBES, a subject of the Queen of Great Britain, and a citizen of London, residing at the city of London, in the county of Middlesex, England, have invented certain new and useful Improvements in Apparatus for Measuring Electricity; and I do hereby declare the following to be a full, clear, and exact description of the invention, such as will enable others skilled in the art to which it appertains to make and use the same, reference being had to the accompanying drawings, in which—

Figure 1:
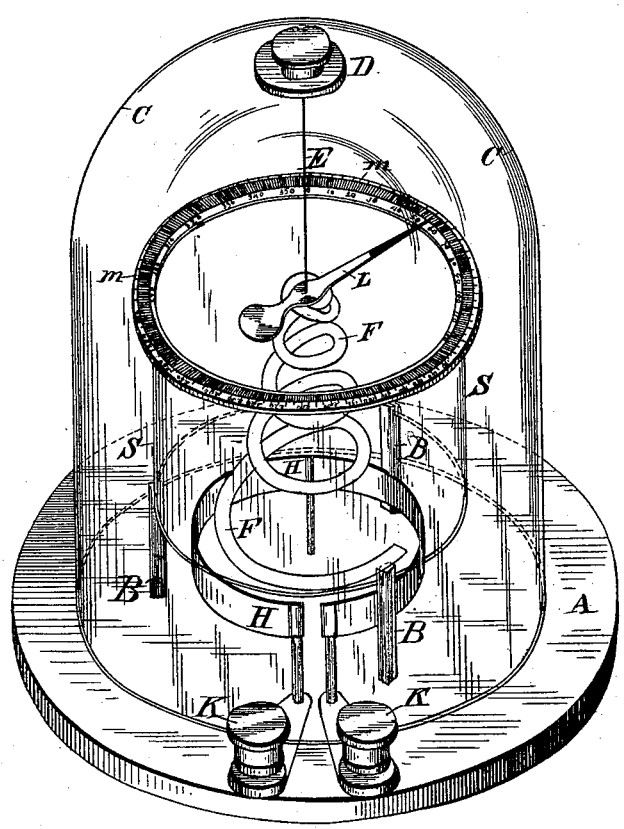
Figure 2:
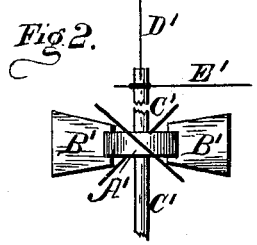
Figure 12:
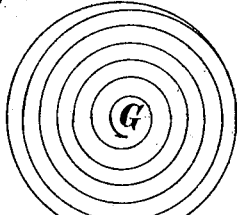
Figure 3:
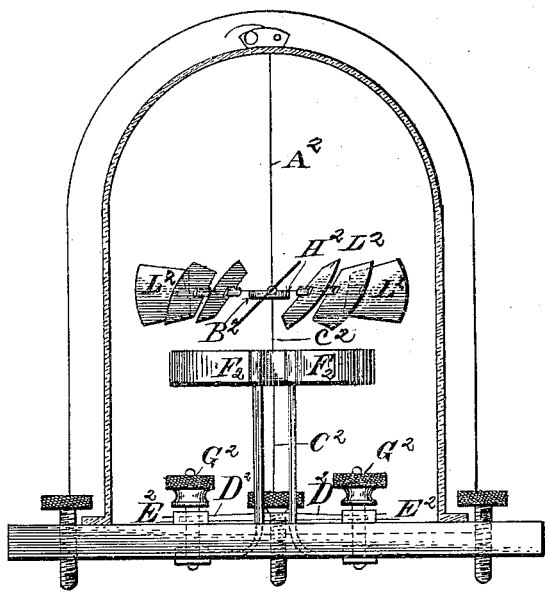
Figure 4:
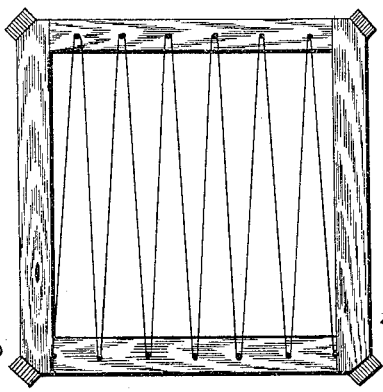
Figure 5:
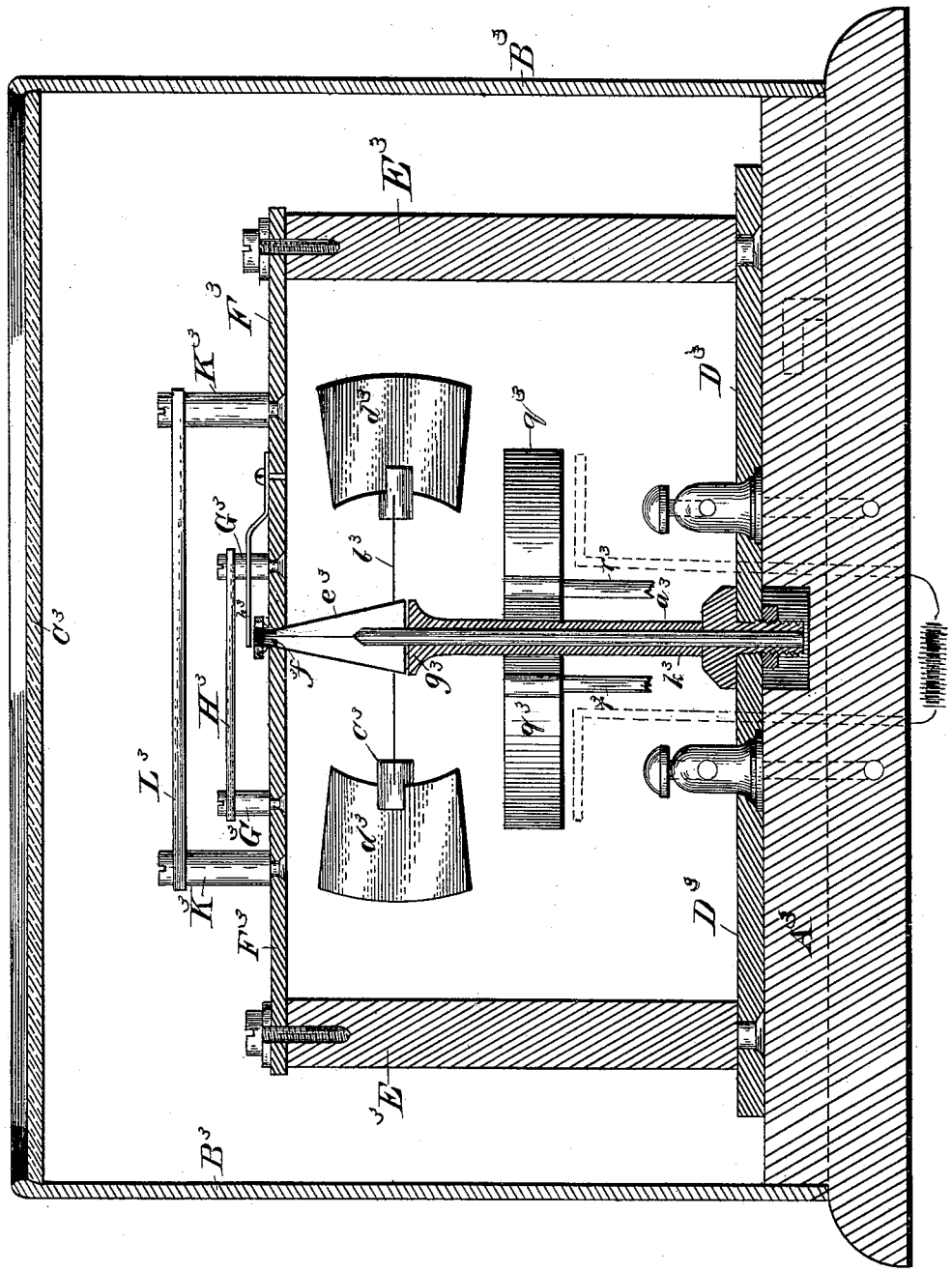

Figure 1 is a perspective view of one form of the apparatus. Fig. 2 is a side view of one form of vane which is applicable for use. Fig. 3 is a side elevation of another form of apparatus. Fig. 4 is a plan view of a modified form of conductor which can be utilized where the current to be measured is very small. Fig. 5 is a side elevation, partly in section, of an apparatus provided with counting devices. Figs. 6 to 12 are detail views.

My method of measuring electric currents is founded upon the fact that an electric current passing through a conductor of electricity generates heat, which heat is carried away from the conductor by the air in contact with it, thus forming convection-currents in the air. The velocities of these air-currents are proportional to the strength of electric current in the conductor. I measure the strength of electric current by introducing any kind of apparatus suitable for measuring the velocity of air-currents. I do not confine myself to the use of atmospheric air. I sometimes use hydrogen or other gases, and sometimes I employ liquids.

My first object is to adapt means for creating a steady and uniform and powerful air-current by means of a conductor heated by electricity. The heat which is supplied by the electric current creates a motive force tending to set up an air-current. The resistance caused by fluid friction of the air is the opposing force. When the air-current has acquired a uniform steady velocity, the resistance is equal to the motive power. In order to get a high velocity with small motive power, it is necessary to have a low frictional fluid resistance. The resistance is diminished by allowing a very free circulation to the air. If the conductor be near the base of the instrument, the air meets with great friction in passing over the base to get to the conductor. For this reason I raise the conductor above the base at least an inch or two. To enable the currents of air to be uniform, I inclose it in a case to guard it against external currents of air. To prevent the conductor from being unduly heated, I usually make it of strip metal instead of a round wire, and to concentrate the heat I attach the conductor to the terminals by stout pieces of metal, which acquire very little heat, owing to their small resistance. If a spiral be cut out of a circle of paper, and it be supported on a pivot at its center, it will rotate about the vertical axis when placed above a conductor carrying a current. If, instead of being pivoted, it be suspended by a wire or fiber, it will be turned through an angle proportional to the square of the electric current. This spiral may be advantageously inclosed in a cylinder of slightly-larger diameter than itself to direct the currents of air, and the whole apparatus may then be put under a glass shade. If a pointer be attached to the revolving part, the pointer will indicate on a fixed divided circular scale the strength of the current.

Another convenient form of apparatus for measuring the air-currents consists of a cork with vanes of mica fixed at an angle of forty-five degrees to the axis of the cork, cuts being made on the circumference of the cork for this purpose. I prefer, however, to make the measuring apparatus out of a circular disk of mica about two inches diameter. Ten corks (more or less) are fixed by cuts in the corks on the periphery of the mica circle. Mica vanes inclined at an angle of forty-five degrees to the mica circle are fixed one to each cork. The whole is suspended at its center by a fine wire of silver, glass, &c., and from the center hangs down a wire and horizontal pointer which points to divisions on a circular scale on the base of the instrument. The electric conductor consists of a circular strip of metal or other material capable of conducting electricity, being slit at one place so as to leave two ends, which are attached metallically to binding-screws which form the terminals of the apparatus. The circular strip is supported preferably at its two ends and at its middle. It is placed close below the vanes and some distance above the base-board of the apparatus, so as to allow free circulation of the air. An inclosing-cylinder is not required for directing the air-currents when this apparatus is used; but a glass shade covers the whole apparatus. The divided circle may be divided so that the pointer will indicate the current directly, or it may conveniently be divided into one hundred parts, so that a deflection of more than one revolution may be noted, a table of values being in this case provided for converting the readings into the values of the electric current. When it is required to measure very small currents, the conductor may have a high resistance, and may be made of wire wound in many turns, as illustrated in Fig. 4, the two ends of the wire being attached to the binding-screws, or it may be made of a comparatively bad conductor—such as string rubbed with charcoal or plumbago or gold leaf—or it may be made of any mixture of a conductor and an insulator—such as carbon mixed with gum or clay—or, in fact, it may be made of any material which gives the required resistance. When the conductor has a high resistance, the instrument may be used for measuring differences of electric potential.

When I wish to measure the total quantity of electricity which has passed through the conductor in any time, I sometimes mount the revolving part upon a delicate spindle pivoted at the two ends and carrying a pinion or wheel which gears into wheel-work of such proportions as to give convenient means of reading off the number of revolutions of the vanes, as in anemometers, gas-meters, &c. The number of revolutions so read off is a measure of the total quantity of electricity which has passed through the conductor. I prefer, however, to use the mica disk and vanes described above, without any inclosing-cylinder to direct the air-currents. In this case I prefer to pivot the revolving part at only one point. To do this I cut a circular hole—say one-half an inch diameter—in the center of the mica disk, and I fit into the hole a paper cone about one inch high, and fix it there by shellac, or by pins going through the paper cone, or by any convenient means. The top of the cone is fixed to a minute ring of aluminium, which is attached to the bottom of a pinion which is hollow and carries a ruby cup—such as those used for ship's or other compasses—in the hole of the pinion. This cup rests upon a hard-steel point fixed vertically on a pillar rising from the base of the apparatus. The rotating part is now quite free to rotate. The pinion gears into suitable wheel-work, the first wheel being at the same level as the steel point supporting the ruby cup. The rotating part so made weighs only about twelve grains. On the base-board is placed a metal base carrying the central pillar with the steel point at its top, and also two pillars for supporting the wheel-work. The base-board also carries three brass pillars for supporting the circular conductor. Two of these may be used as connections to the terminal binding-screws. Two or more of the wheels which move most slowly carry pointers pointing to divisions on circular dials. It is convenient in some cases to arrange this in such a manner that the most-quickly-moving pointer passes over one division of its dial when one ampère hour of current has passed through the conductor. The same indication will be given when one ampère has been used for one hour, or two ampères for half an hour, or half an ampère for two hours, &c. When this apparatus is used as an electric meter in a distribution on the parallel system at constant potential, if there were no friction in the solid parts of the apparatus it would act with absolute truth; but, besides the air-friction, which varies as the square of the velocity of the air-current, we have also the constant friction of the pivot and wheel-gearing. This is unimportant when the range of currents to be measured is not large. When this range is large, I introduce a constant source of heat nearly sufficient to overcome the constant friction, and nearly sufficient to start the apparatus. To obtain this constant source of heat, I employ, besides the main conductor hitherto spoken of, and which is generally of low resistance, a second conductor, placed close to it, of very high resistance, as shown in dotted lines in Fig. 5 of the drawings. I connect the two ends of this conductor with the two wires outside the apparatus, which are at a constant difference of potential, and I arrange the resistance of this second conductor so that with the constant difference of potentials the vanes do not quite begin to move. Any current passing through the main conductor will now start the vanes, and by this means the resistance of the main conductor may be much reduced and it will act correctly over a great range of currents. To obtain a constant motive force to overcome the constant friction, I sometimes use, instead of the above device, a constant battery—say a Daniell's cell—working through a resistance which creates heat just insufficient to start the apparatus.

In the apparatus as I make it I find fifty ohms to be about the required resistance. This device is applicable whether the instrument be used with a parallel distribution, in which case ampère hours must be registered, or with a series distribution, in which case volt hours must be registered.

If the system of distribution be a series one with constant current, I make the thicker conductor of so low a resistance that the constant current passing through it barely suffices to move the vanes. I then choose such a resistance for the other conductor as enables me to include the whole range of potentials of the system of distribution. The wheel-gearing may now be arranged to read "volt hours." If the range is not large and the distribution be in series, I use only one conductor—viz., the one of high resistance.

Having clearly defined and set forth the nature of my inventon, I will now refer to the drawings, which show the details of the various parts of my invention.

Figures 1 to 4 show the apparatus arranged for measuring the strength of the current. Figs. 5 to 11 show the application of counting apparatus to the wheel-work.

Fig. 1 is a perspective view of one form of the apparatus. A is a base-board. B B B are three columns supporting a glass cylinder, S. C is a glass shade inclosing the apparatus. D is a clip on the top of the glass shade for holding a silver wire, E, or a bifilar suspension. The lower end of this wire is attached to the center of a paper spiral, F. This is made by taking a disk of paper, Fig. 12, and cutting it in a spiral, as shown by the line on G. H is a conductor of electricity, attached at its ends to the binding-screws K K. L is a pointer, and M a divided circle.

Fig. 2 is another type of vane, consisting of a cork, A', with four mica vanes, B' B', fitted in slots at an angle of forty-five degrees. C is a glass rod fixed to the center of the cork. D' is a fine silver wire. E' is the pointer. The other parts of the arrangement are as in Fig. 1.

Fig. 3 is an elevation of the arrangement I prefer. $A^2$ is the fine silver wire, attached to a cork, $B^2$. $C^2$ is the rod carrying the pointer $D^2$. $E^2 E^2$ is the divided circle. $F^2 F^2$ is the conductor. $G^2 G^2$ are the binding-screws, attached to the supports of the conductor $F^2$. $H^2$ is a disk of mica with ten corks fixed equally on its edge. $L^2 L^2$ are vanes of mica, inclined at forty-five degrees, fixed to the corks. The external diameter of the whole is four inches.

Fig. 4 shows another form of conductor which may be used. The dimensions of the conductor depend altogether on the strength of current it is required to measure.

Many forms of conductor may be used, but I prefer those mentioned above.

Figure 7:
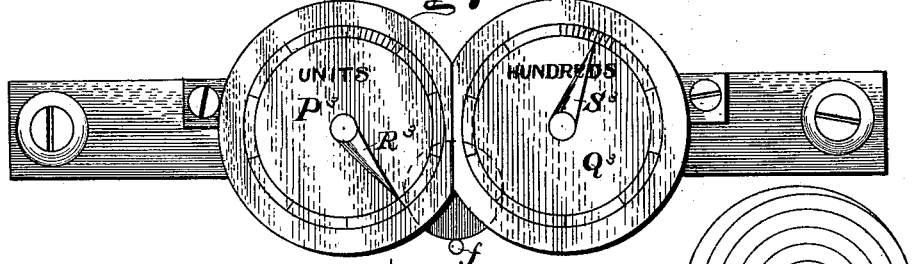
Figure 8:
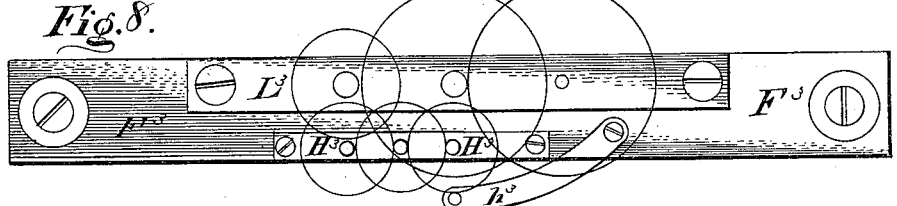
Figure 9:
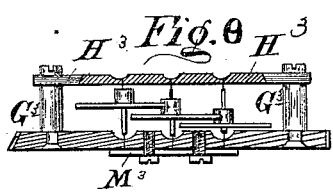
Figure 10:
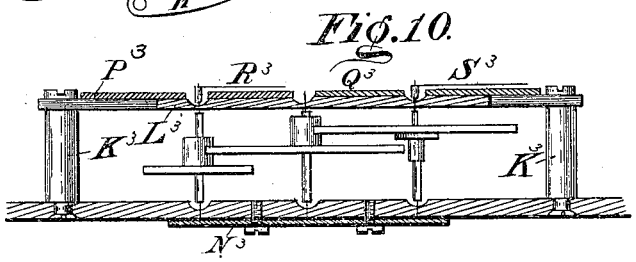
Figure 6:
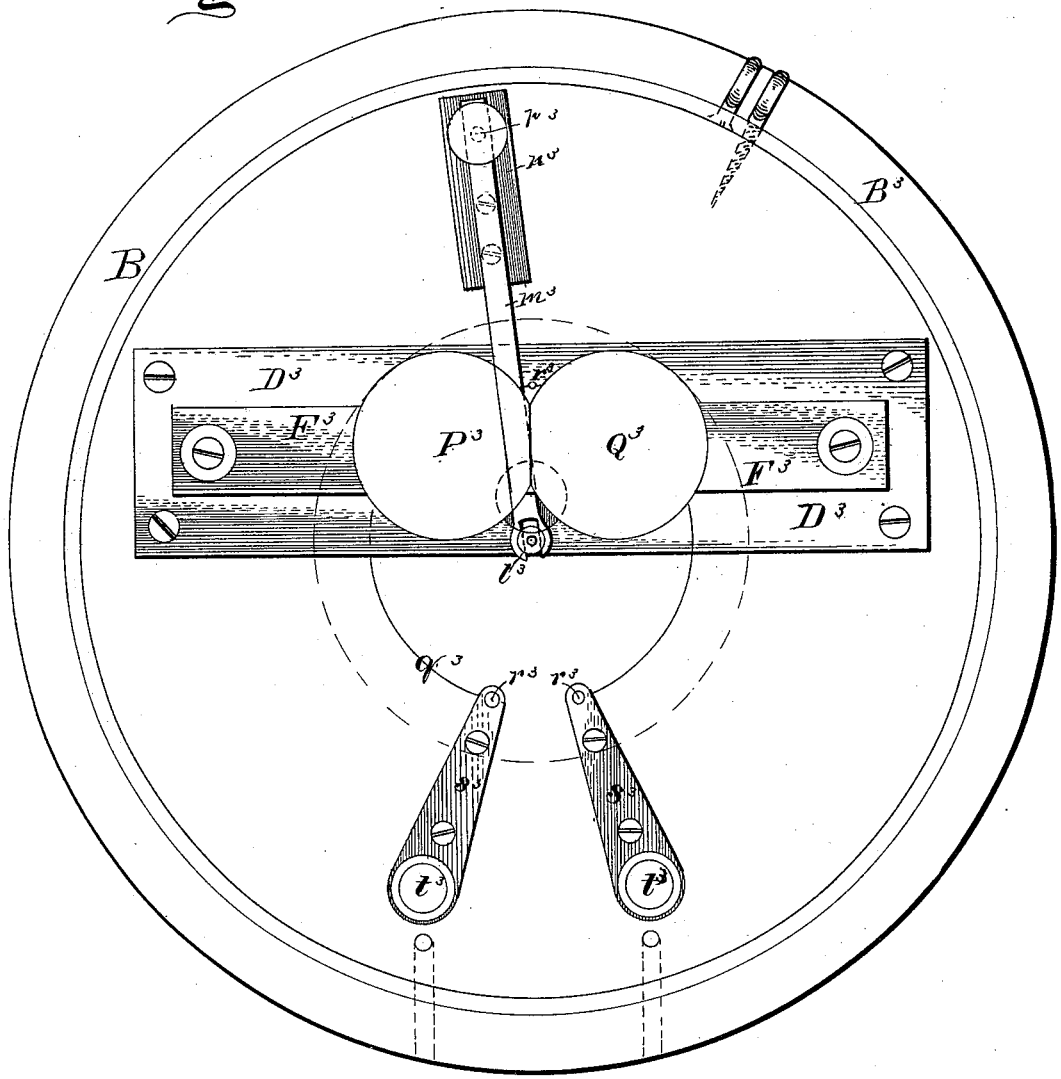
Figure 11:
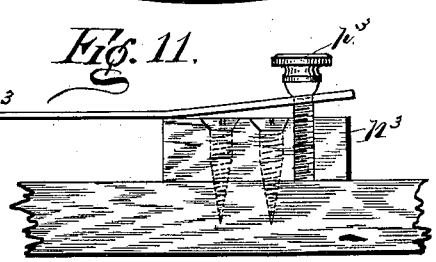

Figs. 5 to 11 illustrate the application of counting apparatus to the apparatus of Fig. 3. In these drawings the same letters apply to the same parts. Fig. 5 is a sectional elevation, and Fig. 6 is a plan, of the instrument. Fig. 7 shows a plan of the dials. Fig. 8 shows the positions of the wheels and pinions, the teeth and leaves of which are not indicated, since their number depends upon the purpose to which the instrument is to be applied. Fig. 9 shows details of the three most quickly-moving wheels, and Fig. 10 of the three wheels of slowest motion. Fig. 11 shows an arrangement to prevent injury in transport.

$A^3$ is a base-board.

$B^3$ is a cylinder of brass with a glass top, $C^3$, to form the case.

$D^3$ is a metal base screwed to the base-board.

$E^3 E^3$ are two metal pillars attached to the base $D^3$.

$F^3$ is a brass bar screwed to the tops of the pillars. A little play is allowed in one of these screws to adjust the depth of the gearing of the pinion attached to the vanes. When adjusted, it is then fixed.

$G^3 G^3$ are two pillars attached to the brass bar $F^3$, and carrying the bar H.

$K^3 K^3$ are two pillars, also screwed to $F^3$, and carrying the bar $L^3$.

$M^3 N^3$ are steel plates to support the lower ends of the pivots of the wheels. The arrangement of wheels and pinions may be as shown in Figs. 8, 9, and 10. Each wheel may have eighty teeth and each pinion may have eight leaves.

$P^3 Q^3$ is the double dial.

$R^3 S^3$ are the two pointers.

$a^3$ is a pin screwed into the metal base with a hard-steel point at the top.

$b^3$ is the circular disk of mica, $c^3$ the corks at its periphery, and $d^3$ the vanes.

$e^3$ is the paper cone, fastened to the mica disk.

$f^3$ is the pinion of eight teeth, which contains a ruby cup to rest on the steel point.

$g^3$ is a cylinder of wood sliding on the pin $a^3$, having a shoulder at the top to catch the cone $e^3$ and press the top of the pinion $f^3$ against a stop, $h^3$, which is fixed to the metal plate. This prevents injury in traveling. The cylinder of wood, $g^3$, has a slot, $k^3$, in which the fork $l^3$, cut in a metal spring, $m^3$, plays. The spring $m^3$ rests on a piece of metal, $n^3$, to which it can be secured by the screw $p^3$.

$q^3$ is the conductor, which may be of platinum silver alloy, half an inch wide, bent in a circle, and of such a thickness as to give a resistance of one-tenth of an ohm. It is supported by three brass or copper pillars, $r^3$. Two of these are at the ends of the conductor, and are attached by metal strips $s^3 s^3$ to the terminals $t^3 t^3$. If made as described, the mica vanes inclosing a circle of a diameter of four inches, one division of the dial corresponds to about one ampère hour. A final adjustment may be made by altering the resistance of the conductor by cutting it, or by altering the air-friction by putting obstructions to the free circulation of the air-current.

I claim—

1. In an apparatus for measuring electricity, the combination, with a conductor heated by an electric current, of mechanism for indicating the current of air created by said heated conductor.

2. An apparatus for measuring the strength of the air-currents created by the heating effects of an electric current, consisting of vanes placed in proximity to the electric-current conductor and so supported that they tend to rotate when placed in the fluid current, and one or more fibers, wires, or springs which resist the rotation of the vanes.

3. The combination, with a conductor heated by an electric current, of vanes rotated by the fluid current created thereby, and registering apparatus connected with and operated by said vanes, substantially as set forth.

4. In an apparatus for measuring electric currents, the combination, with an electric conductor designed and adapted to be heated by an electric current, of a vane carried above said conductor, and indicating devices operated thereby to visually indicate the strength of a current of air created by said conductor when heated.

5. The combination of an electric meter consisting of mechanism set in motion by the electric current to be measured, with a constant current of electricity derived from a constant battery to overcome wholly or in part the constant part of the friction of the mechanism.

GEORGE FORBES.

Witnesses:
A. C. F. WEBB,
CHAS. ROCHE.